United States Patent [19]

Gourlet

[11] 3,926,205

[45] Dec. 16, 1975

[54] QUICK COUPLING CONNECTORS
[75] Inventor: Gaston Gourlet, Vaucresson, France
[73] Assignee: Etablissements Boutrait-Morin, Aubervilliers, France
[22] Filed: Apr. 9, 1973
[21] Appl. No.: 349,311

[30] Foreign Application Priority Data
Apr. 11, 1972 France............................. 72.12586

[52] U.S. Cl. ............ 137/223; 137/231; 137/533.17
[51] Int. Cl.² ......................................... F16K 15/20
[58] Field of Search ...... 137/223, 231, 532, 533.17; 152/415

[56] References Cited
UNITED STATES PATENTS

| | | | |
|---|---|---|---|
| 1,266,192 | 5/1918 | Anthony............................ | 137/231 |
| 1,498,226 | 6/1924 | Beck................. | 137/533.17 |
| 2,237,559 | 4/1941 | Jenne................................ | 137/231 X |

FOREIGN PATENTS OR APPLICATIONS

| | | | |
|---|---|---|---|
| 977,139 | 12/1964 | United Kingdom................. | 137/231 |
| 956,382 | 1/1957 | Germany........................... | 152/415 |
| 963,041 | 5/1957 | Germany........................... | 152/415 |

Primary Examiner—Harold W. Weakley
Attorney, Agent, or Firm—Diller, Brown, Ramik & Wight

[57] ABSTRACT

A quick-coupling connector adapted to be coupled to an inflation valve of an air chamber or tire while being in communication with a source of fluid under pressure, in particular, a bicycle pump. The connector comprises a tubular body, a piston actuator which may be formed in one or two parts between an operating lever pivoted in the tubular body for axially displacing the piston actuator and a sealing ring which in response to the displacement is compressed and tightly squeezed against the valve body of the inflation valve conforming to its threaded outer surface and forming a fluid-tight connection therewith. Different embodiments are adapted to Schrader and Sclaverand inflation valves. In the case of a Schrader inflation valve, a check valve is provided in the connector somewhere in the path of fluid flow between the pump and the inflation valve.

11 Claims, 12 Drawing Figures

QUICK COUPLING CONNECTORS

The present invention concerns connectors adapted to be coupled to the inflation valve of an air chamber or tire while being in communication with a source of fluid under pressure such as a bicycle pump.

It is well known that for inflating the tires of vehicles, particularly two-wheel vehicles such as bicycles, motorcycles, or motor-assisted cycles, a flexible connector is generally used having one end sealingly coupled to a source of fluid under pressure such as a bicycle pump or hand air pump, the other end being adapted to be screwed onto the body of the inflation valve.

The use of such a system is considered to be slow and inconvenient.

Further, it has already been propsed to overcome these drawbacks by providing inflation means, in particular, bicycle pumps with a quick-coupling connector having a lateral outlet.

This connector even if it presents a comparative advance over the earlier practice nevertheless does not give entire satisfaction owing to the fact that the operator is obliged to hold the connector firmly in contact with the tire being inflated since the connector is not threaded on the valve but merely in engagement therewith.

This holding of the connector in firm contact with the valve is effected to the detriment of the pumping force and if this drawback is negligeable in the case of inflating tires equipped with Scaverland type valves, this is not so, when inflating tires equipped with Schrader valves. In fact with this type of valve which is well known, inflation is only possible if an actuator or push rod overcomes the spring force of the valve member of the inflation valve assuring the fluid-tightness between the interior of the air chamber or tire and the surroundings.

Under such conditions inflation is found to be particularly difficult, it can even be said that to attain high pressures the physical force necessarily exceeds normal capacities.

An aim of the present invention consists in providing quick-coupling connectors of the above-mentioned type which besides being of a simple and economical construction are free of the disadvantages briefly set out above.

The present invention consists in a quick-coupling connector adapted to be temporarily fit on an inflation valve of an air chamber or tire comprising a tubular body, a piston actuator between an operating member and a sealing ring and axially displaceable by means of said operating member between an operative or coupling position in which the piston actuator effectively exerts an axial compression force against the sealing ring, the temporary deformation thereof assures the fluid-tightness between the inflation valve body and the connector, orifices being provided in the tubular body and the piston assure the communication between a source of fluid under pressure and the inflation valve.

With such a connector, whose ease in use will be appreciated, the user is able to effect the inflation of the tire or air chamber without worrying about fluid-tightness between the connector and the inflation valve, nor holding the connector firmly in contact with the inflation valve which makes its use very convenient.

Preferably, a check valve disposed in the path of fluid flow between the source of fluid under pressure and the inflation valve is provided.

Preferably, the valve body of the inflation valve has a screw-threaded peripheral wall with which the inner peripheral wall of the sealing ring comes into continuous mating engagement in the coupling position of the operating member.

Other features and advantages of the invention will be brought out in the description with follows by way of example with reference to the accompanying drawings, in which.

Figure 1:
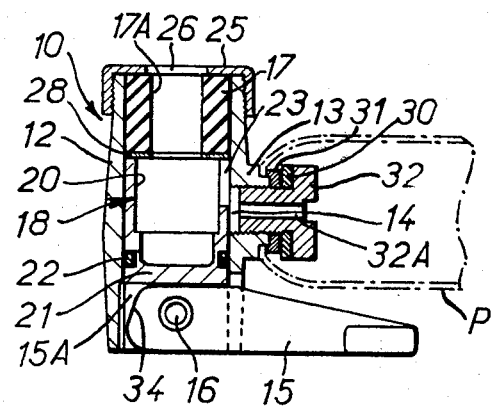
FIG. 1 shows an elevation view of one embodiment of the invention.
Figure 3:
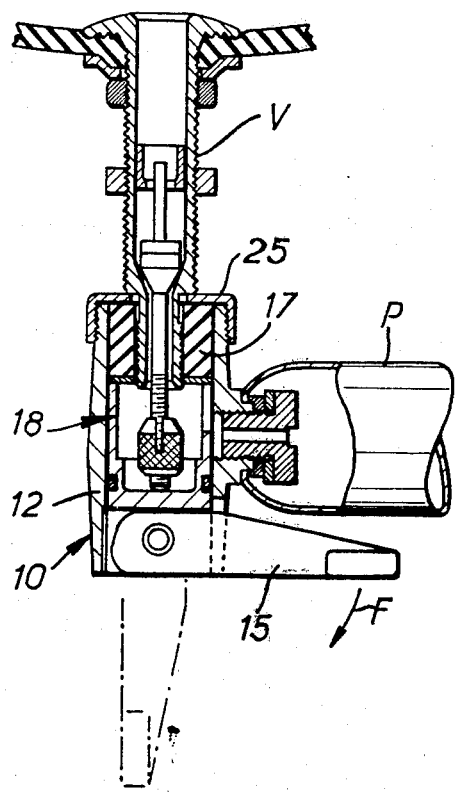
FIG. 3 shows such a connector in place on a Sclaverand valve known per se.
Figure 2:
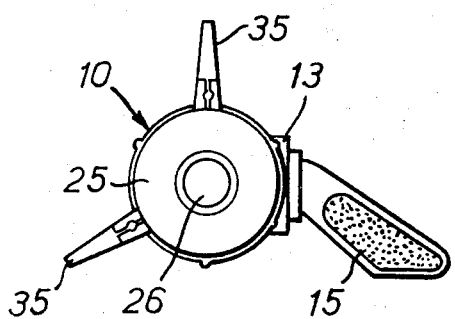
FIG. 2 is a corresponding plan view.

In the embodiment illustrated in FIGS. 1–3, the quick-coupling connector 10 is intended to enable inflation of an air chamber equipped with a Sclaverand type inflation valve V known per se (FIG. 3).

The present quick-coupling connector essentially comprises a tubular body 12 with a radial extension 13 having a bore 14. A piston actuator 18 is mounted in the tubular body 12 between an operating lever or member 15 adapted to pivot in a cavity 15A about a pivot pin 16 arranged diametrically therein and a sealing ring 17 with an axial passageway 17A.

The piston actuator includes a blind bore 20, the closed end 21 of which cooperates with the operating lever 15, a gasket 22, and a port 23 whose function will be brought out below.

The cap 25 screwed onto the tubular body and having an axial hole 26 is adapted to hold the sealing ring 17 in the tubular body 12; a washer 28 is interpositioned between the open end of the piston actuator 18 and the sealing ring.

Such a connector can be fixed to a pump P shown in dash-dotted lines with an assembly comprising a gasket 30, a washer 31 and a locking screw 32 threaded in a tapped bore in the extension 13 and provided with a fluid flow passage 32A.

In this embodiment the connector is secured to a bicycle pump but by means of a suitable assembly; the quick-coupling connector could be independent of the pump and coupled for example to the end of a tube or hose connected to some other source of fluid under pressure.

The operating lever 15 has an operative segment forming a control cam surface adapted to cooperate with the closed end of the piston actuator.

The radially projected ribs 35 are associated with the tubular body for centering the pump/connector combination on the frame of a bicycle.

To bring the combination into operation, after unscrewing and removing the cap (not shown) of the inflation valve, the sealing ring of the quick-coupling connector engages the end portion of the body of the inflation valve (FIG. 3), then by pivoting the lever 15 clockwise (direction of the arrow F) fluid-tightness is effected between the inflation valve V and the pump P by temporarily deforming the sealing ring 17 owing to the axial compressive force exerted thereon by the piston actuator 18 during its axial displacement caused by the rotation of the operating segment 34 of the control cam.

Indeed, the axial compressive force exerted on the sealing ring 17, whose volume remains constant throughout, causes the inner peripheral walls of the sealing ring to be squeezed tightly into intimate contact with the threaded outer wall of the inflation valve body thereby conforming to its shape.

The actual inflation of the tire or air chamber could be effected by the pump P in the usual way.

Figure 4:
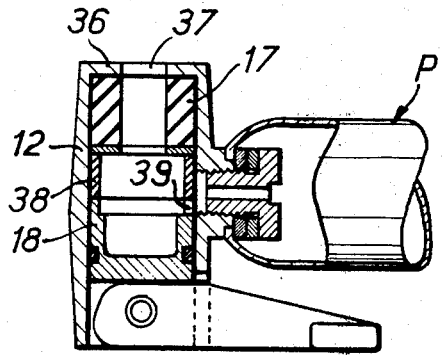

Reference with now be made to FIG. 4 where the same reference numerals and letters designate elements similar to that of the preceding embodiment.

In this embodiment the sealing ring 17 is not, as in the case of the previous embodiment, held in place by a separate cap but by an annular end wall or inwardly directed rim 36 on the tubular body 12 having a central hole 37.

In addition the piston actuator 18 acts on the sealing ring 17 through an intermediary tubular member 38, a port 39 being provided in the intermediary member 38 or in the cylindrical wall of the piston actuator 18 for the flow of fluid between the pump P and the tire or air chamber.

The connector functions in the same manner as the previous embodiment.

Figure 5:
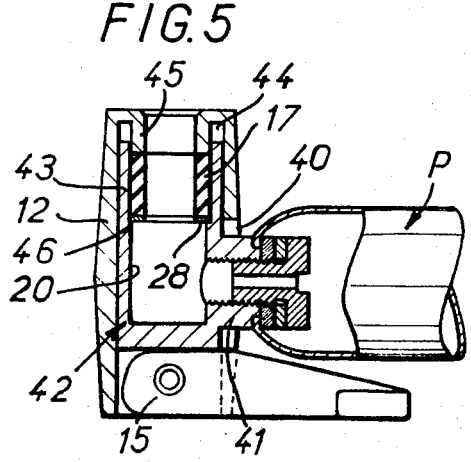
FIGS. 4 and 5 are views similar to FIG. 1 for two different modified embodiments.

Reference is now made to FIG. 5, the tubular body 12 in this embodiment has an opening 40 to provide axial clearance for the radial extension 41 integrally formed with the piston actuator 42. The free end 43 of the piston cylinder remote from the operating lever slides in an annular space 44 formed by an inwardly turned cylindrical wall 45 of the tubular body 12.

The internal bore 20 of the piston actuator includes in addition to the radial extension 41 a shoulder 46 adapted to provide a bearing surface for a washer 28, one end of the sealing ring resting on the washer 28, the other end of the sealing ring 17 being in contact with the edge of the inwardly turned cylindrical wall 45.

As it can be seen, the sealing ring 17 is captive between the piston actuator 42 and the inwardly turned cylindrical wall 45 of the tubular body 12.

An operating lever or member 15, as in the preceding embodiments, is adapted to displace axially the piston actuator 42 acting against the sealing ring 17 which is in turn temporarily deformed by the compressive force exerted thereon thereby effecting fluid-tightness between the inflation valve body and the connector.

Figure 6:
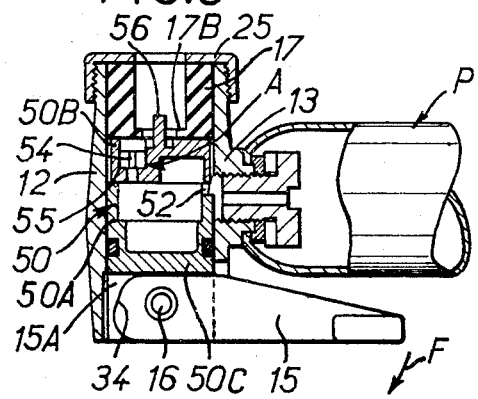
FIG. 6 is a view similar to that of FIG. 1 illustrating an embodiment for use with a Schrader valve.
Figure 8:
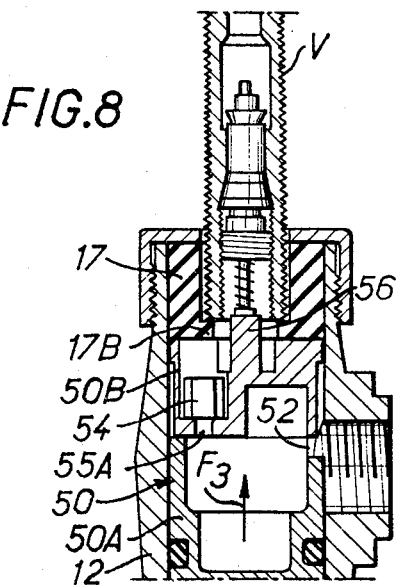
FIGS. 8 and 9 illustrate the two positions of the connector shown in FIG. 6 to a schrader valve.
Figure 9:
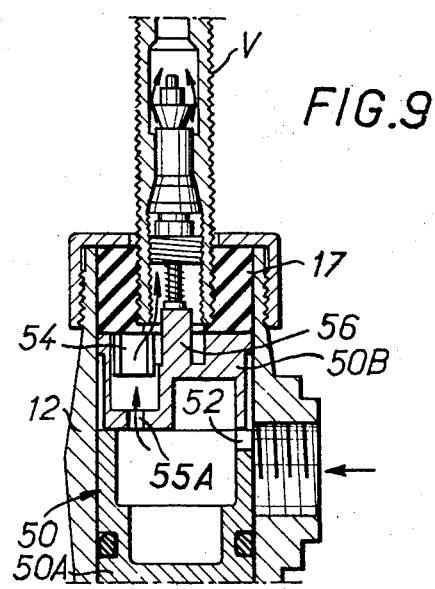

In the alternative embodiment illustrated in FIG. 6, the quick-coupling connector is particularly adapted for inflating an air chamber or tire provided with a Schrader type valve shown in FIGS. 8 and 9.

In this embodiment the tubular body 12 is the same as described relative to FIG. 1 and comprises a radial extension 13 for connection with a pump P and a cavity 15 in which the operating lever can pivot about its pivot pin 16.

As in the preceding embodiments, the piston actuator indicated generally by numeral 50 is disposed between a sealing ring 17 and a cover 25 retaining the ring axially.

In this illustrated embodiment the piston 50 comprises first and second parts 50A and 50B, the first or rearward piston part 50A having a blind bore and a closed end 50C cooperating with the operative segment of the cam on the operating lever 15. The free edge of the rearward piston part cooperates with the forward piston part which is in contact with the sealing ring 17 which is provided with an inwardly projecting rim 17B whose function will be explained below.

Figure 7:
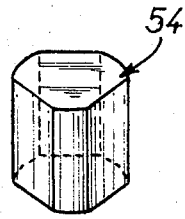
FIG. 7 is a view in perspective of a non-return or check valve member such as indicated at A in FIG. 6.

A port 52 is formed at the plane of contact of the two piston parts between the pump P and the check valve member 54 (fully illustrated in FIG. 7) which is received in a recess sealing off under its own weight the hole 55A formed in the lower end of the forward piston part 50B.

The forward piston part 50B is also provided with an axial projection 56 which acts as the push rod of the inflation valve V.

With a view to inflating the air chamber or tire with a well-known Schrader type valve, the quick-coupling connector which is for example incorporated on the pump P is put over the free end of the inflation valve body (FIG. 8) until the inwardly projecting rim 17B of the sealing ring abuts against the end of the inflation valve body while the end of the projection kisses the free end of the stem of the Schrader valve member. The operating lever 15 is then swung around so that operative segment 34 of the cam effects the axial displacement of the rearward and forward piston parts 50A and 50B along the direction of the arrow F3.

The axial displacement of the piston parts effects two operations: depression of the Schrader valve stem against the biasing force of its associated spring and compression of the sealing ring 17 which, owing to its volume remaining constant with its shape changes, is squeezed tightly against the inflation valve body as described with respect to the embodiment of FIG. 3 thereby producing a perfect fluid-tightness in the resultant assembly.

It should be noted that during the pivoting of the lever 15 a displacement of the valve body relative to the tubular body of the connector is effected as is clearly observable from FIGS. 8 and 9.

Thus in such a case the valve member 54 acts as a check valve facilitating the inflation of tires.

Figure 10:
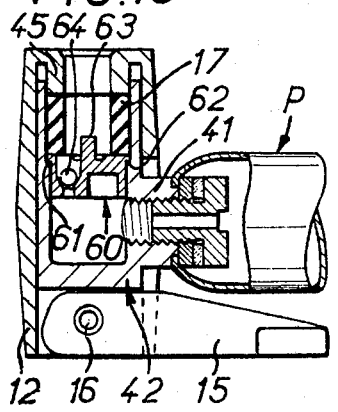
FIGS. 10–12 illustrate three other possible embodiments.

In the embodiment of FIG. 10 the tubular body 12 is of a structure similar to that of the embodiment of FIG. 5, likewise with respect to the piston actuator 42 which includes a radial extension 41 to which the end of the pump is connected.

The edge of the sealing ring 17 remote from the piston part is in contact with the inwardly turned cylindrical wall 45, the opposed edge of the sealing ring 17 bears against actuator part 60 received in the piston 42 and held therein by a flange 61 bearing against a shoulder 62.

The actuator part 60 comprises an axial projection 63 and a check valve 64 comprising, in this case, a ball normally bearing against a valve seat provided in the actuator part.

As with the preceding embodiments the pivoting of the lever 15 about the pivot pin 16 causes an axial displacement of the piston part 42 and a compression of the sealing ring 17 thereby assuring fluid-tightness between the inflation valve body and the connector.

Figure 11:
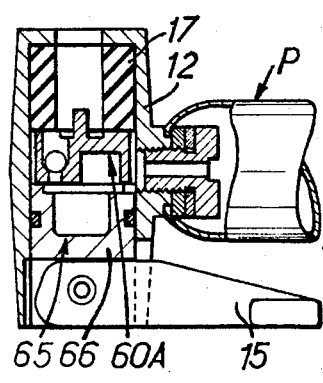

In the embodiment of FIG. 11 the tubular body 12 of the connector is similar to that of the embodiment of FIG. 4 and an actuator part similar to the one described with respect to FIG. 10 is held captive between the sealing ring 17 and the piston actuator 65, the closed end 66 of which being adapted to cooperate with the operating lever 15.

As before, the fluid-tightness between the inflation valve and the connector is obtained by the pivoting of the operating lever 15 causing the compression and deformation of the sealing ring 17 which is tightly squeezed against the inflation valve body.

Figure 12:
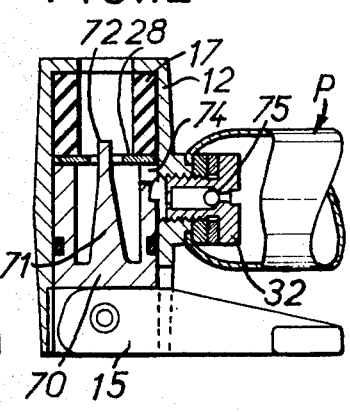

In the embodiment of FIG. 12 the tubular body 12 is similar to preceding embodiments except that the piston actuator 70 bears at one end against the sealing ring 17 through the washer 28 and at the other end cooperates with the operating lever 15. The piston actuator 70 comprises an axial projection 71 with a free end 72 which extends beyond the washer 28 in order to cooperate with the stem of the inflation valve V. The piston actuator 70 further comprises one or more orifices 74 in the vicinity of the washer 28 for enabling the flow of fluid from the pump P to the inflation valve V.

In such an embodiment, the interior of the lock screw 32 providing the connection of the pump with the tubular body is arranged to include a check valve indicated globally by the numeral 75.

The operation is in every aspect similar to that described hereinabove.

The invention is of course not limited to the embodiments described and illustrated herein but includes to contrary all equivalents, alternatives and modification within the scope of the appendant claims; accordingly the check valve could be of a different construction, for example, a ball bearing against a rubber diaghragm.

The ball itself could be replaced for example by a suitably calibrated spring, a piece of rubber or other material of suitable shape so that this piece is lifted during the inflation allowing the flow of air through an associated valve seat whereas when the inflation opeation is finished it closes off the passage by its mere weight resting against the valve seat thereby preventing return flow which unquestionably facilitates inflation of the air chamber or tire.

What I claim is:

1. A quick-coupling connector adapted to be temporarily coupled to an inflation valve of an air chamber or tire while being in communication with a source of fluid under pressure, said connector comprising a tubular body, an elastically deformable sealing ring disposed in said tubular body adjacent one end thereof for receiving an inflation valve body, piston actuator means mounted for axial displacement in said tubular body, an operatino, member carried by said tubular body for displacing said piston actuator means, said piston actuator means being arranged between said sealing ring and said operating member for movement by said operating member to compress said sealing ring, said operating member having a coupling position for exerting a compressive force on said sealing ring temporarily deforming said sealing ring in order to assure fluid-tightness between said connector and an inflation valve body positioned within said sealing ring, said operating member also having a rest or uncoupled position wherein said sealing ring is uncompressed, said tubular body having an air flow orifice therethrough and connecting means for connecting said tubular body air flow orifice to the source of fluid under pressure, said connecting means being in the form of a tubular radial extension integrally formed on said tubular body in communication with said tubular body air flow orifice, said piston actuator means having an air passage therein in communication with said sealing ring and an air flow orifice between said air passage and the exterior of said piston actuator means into said tubular body, said piston actuator means air flow orifice being in communication with said tubular body air flow orifice for directing fluid under pressure to said sealing ring, and check valve means disposed in the path of fluid flow between the source of fluid under pressure and said sealing ring for preventing return flow of fluid under pressure from inflation valve to the source of fluid under pressure.

2. A connector according to claim 1 wherein the check valve means is effectively arranged between the sealing ring and the piston actuator means.

3. A connector according to claim 2, wherein the piston actuator means includes an actuator part adapted to actuate a stem of the inflation valve to which it is coupled, and wherein said check valve means is incorporated in said actuator part.

4. A connector according to claim 3, wherein the actuator part is arranged coaxially of the tubular body, said check valve means being radially displaced relative to the axis of the tubular body.

5. A connector according to claim 2, wherein said piston actuator means cooperates with the operating member and there is a further part between said piston actuator means and said sealing ring which cooperates with the sealing ring and houses the check valve means.

6. A connector according to claim 2, wherein the check valve means comprises a right prism-shaped valve member displaceable in a complementarily shaped recess.

7. A connector according to claim 1, wherein the check valve means is arranged in said radial extension.

8. A quick-coupling connector adapted to be temporarily coupled to an inflation valve of an air chamber or tire while being in communication with a source of fluid under pressure, comprising a tubular body, an elastically deformable sealing ring disposed in said tubular body, piston actuator means mounted for axial displacement in said tubular body, an operating member for displacing the piston actuator means, said piston actuator means being arranged between the sealing ring and said operating member, said operating member having a coupling position for exerting a compressive force on the sealing ring temporarily deforming said ring in order to assure fluid-tightness between an inflation valve body and the connector, said operating member also having a rest or uncoupled position, an orifice in said piston actuator means providing a path of fluid flow between a source of fluid under pressure and an inflation valve while permitting movement of said piston actuator means relative to said tubular body, said piston actuator means having an end directly engaging said sealing ring for compressing the same, a recess in said end of said piston actuator means directly opposing said sealing ring and being partially closed by said sealing ring, a fluid passage through said piston actuator means including a portion through said recess and opening into the interior of said sealing ring, a check valve member in said recess for closing said fluid passage, and said sealing ring being directly engageable by said check valve member for retaining said check valve member in said recess while permitting passage of fluid through said recess into said sealing ring.

9. A connector according to claim 8, wherein a radial extension is formed integral with the piston actuator means, said tubular body having a slot enabling the displacement of the radial extension therein.

10. A connector according to claim 8, wherein said piston actuator means cooperates with the operating member and there is a further part between said piston actuator means and said sealing ring which cooperates with the sealing ring and houses the check valve means.

11. A connector according to claim 8, wherein the check valve means comprises a right prism-shaped valve member displaceable in a complementarily shaped recess.

* * * * *

UNITED STATES PATENT AND TRADEMARK OFFICE
CERTIFICATE OF CORRECTION

PATENT NO. : 3,926,205
DATED : December 16, 1975
INVENTOR(S) : Gaston Gourlet

It is certified that error appears in the above—identified patent and that said Letters Patent are hereby corrected as shown below:

In the heading, amend the Assignee's name to read as follows:

"Etablissements Poutrait-Morin, Aubervilliers, France".

Signed and Sealed this ninth Day of March 1976

[SEAL]

Attest:

RUTH C. MASON
*Attesting Officer*

C. MARSHALL DANN
*Commissioner of Patents and Trademarks*